(No Model.) 2 Sheets—Sheet 1.
R. M. RUCK & E. JONES.
COUNTERBALANCING FLOAT FOR MARINE TORPEDOES.
No. 319,626. Patented June 9, 1885.
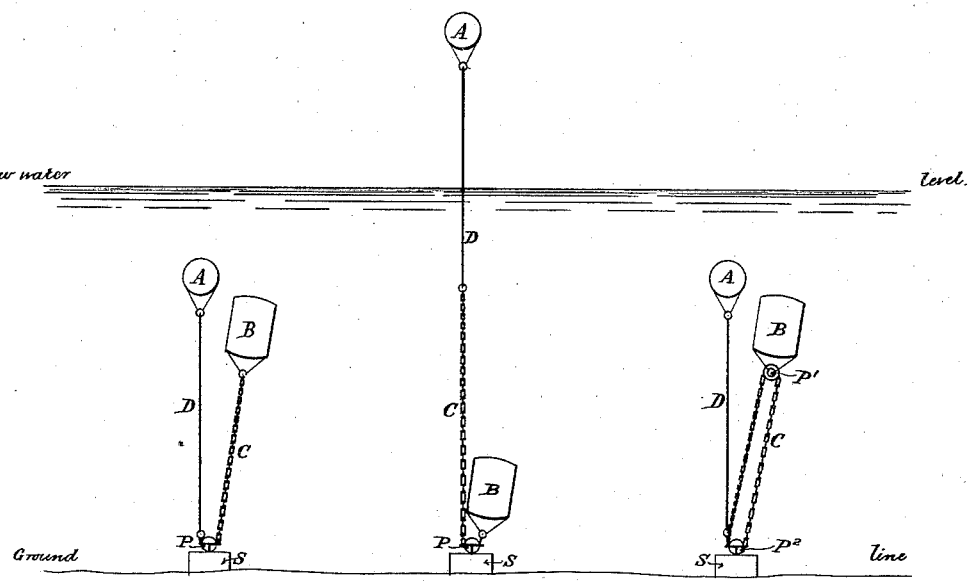
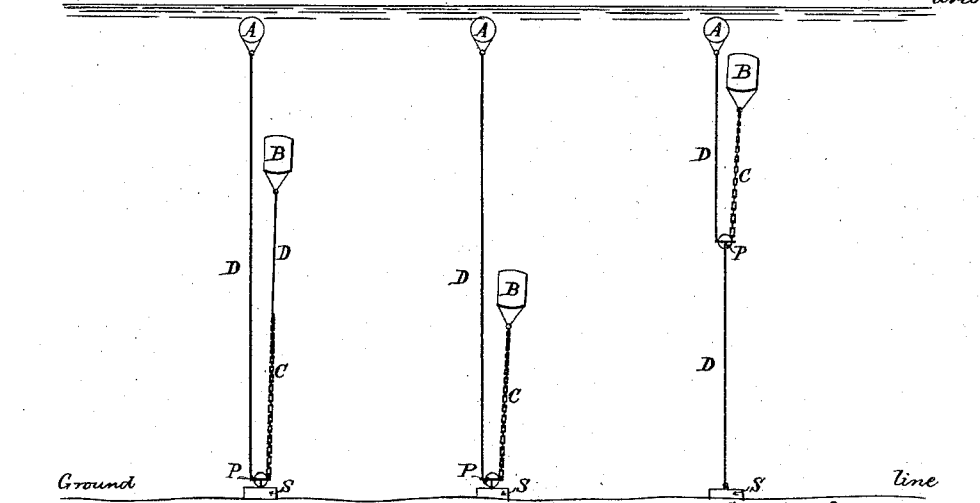

(No Model.) 2 Sheets—Sheet 2.
R. M. RUCK & E. JONES.
COUNTERBALANCING FLOAT FOR MARINE TORPEDOES.
No. 319,626. Patented June 9, 1885.
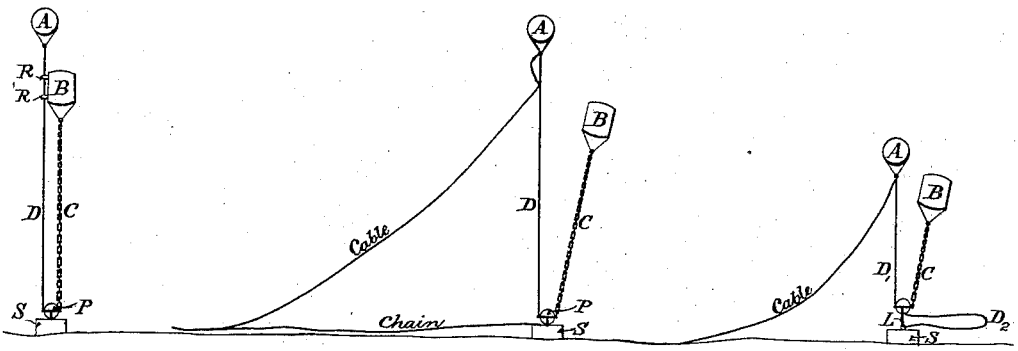
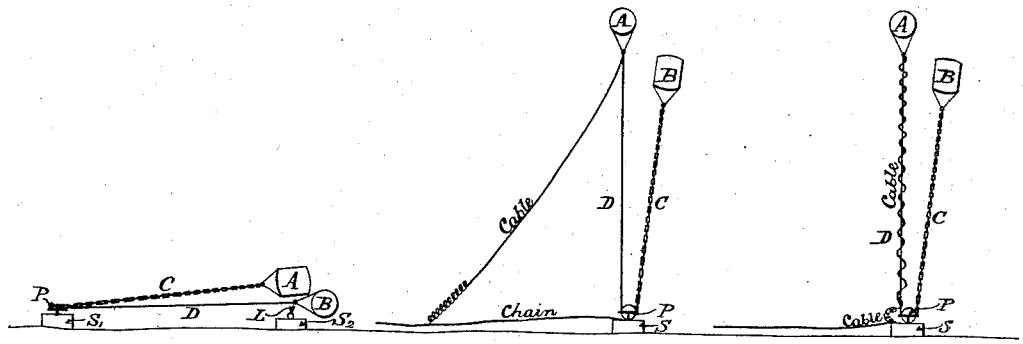

United States Patent Office.

RICHARD MATTHEWS RUCK, OF CHATHAM, COUNTY OF KENT, AND EDWYN JONES, OF WALLINGTON, COUNTY OF SURREY, ENGLAND.

COUNTERBALANCING-FLOAT FOR MARINE TORPEDOES.

SPECIFICATION forming part of Letters Patent No. 319,626, dated June 9, 1885.

Application filed April 19, 1884. Renewed March 10, 1885. (No model.) Patented in England February 20, 1884, No. 3,654; in France April 10, 1884, No. 161,475; in Belgium April 12, 1884, No. 64,819; in Victoria May 13, 1884, No. 3,722; in Tasmania May 15, 1884, No. 321/9; in South Australia May 17, 1884, No. 453; in Portugal May 21, 1884, No. 916; in New South Wales July 17, 1884, No. 7,331; in Spain August 8, 1884, No. 6,004; in Queensland August 11, 1884, No.7; in New Zealand September 16, 1884, No. 1,220; in East Indies November 18, 1884, No. 175, and in Norway November 21, 1884.

*To all whom it may concern:*

Be it known that we, RICHARD MATTHEWS RUCK, of Prospect Row, Chatham, in the county of Kent, England, captain, R. E., and EDWYN JONES, of Woodcote, Dower House, Wallington, in the county of Surrey, England, barrister at law, subjects of the Queen of Great Britain, have invented certain new and useful Improvements in Apparatus for Maintaining Floating Bodies, such as Torpedoes, at a constant or nearly constant depth below the surface of the water, (for which we have secured Letters Patent in England, No. 3,654, dated February 20, 1884; in France, No. 161,475, dated April 10, 1884; in Belgium, No. 64,819, dated April 12, 1884; in Spain, No. 6,004, dated August 8, 1884; in Portugal, No. 916, dated May 21, 1884; in Norway, dated November 21, 1884; in Victoria, No. 3,722, dated May 13, 1884; in New South Wales, No. 7,331, dated July 17, 1884; in Queensland, No. 7, dated August 11, 1884; in Tasmania, 321/9, dated May 15, 1884; in South Australia, No. 453, dated May 17, 1884; in New Zealand, No. 1,220, dated September 16, 1884, and in East Indies, No. 175, dated November 18, 1884,) of which the following is a specification.

This invention has for its object improvements in apparatus for maintaining torpedoes or other floating bodies at a constant or nearly constant depth below the surface of the water, when the depth of water is increased or decreased either by rise and fall of tide or by any other means, at the same time giving no indication of the presence of these bodies at or above the surface of the water.

The invention is especially applicable to the concealment of floating bodies and explosive charges when placed under water in positions where fluctuations of the water-level occur.

In the accompanying drawings, which illustrate our method as applied to maintaining torpedoes at a practically unvarying depth beneath the surface of water, Figure 1 shows our apparatus in its simplest form. Fig. 2 shows the same in another position. Fig. 3 shows a modification adapted to shallow water. Figs. 4, 5, and 6 show apparatus for deep water. Fig. 7 shows the application of a device to prevent twisting. Fig. 8 shows apparatus with an electric cable attachment. Figs. 9 and 10 show apparatus for retaining a torpedo near the bottom until required for use. Figs. 11 and 12 show other modifications with cable attachments.

In Figs. 1 and 2, A represents the floating body, which in this instance is a torpedo. B is what we term the "counterpoise." It is flexibly connected with the floating body. C is a chain graduated in size and weight. P is a pulley, and S is the anchor or sinker. D is the mooring-rope or chain.

As shown, the chain C and rope D constitute the flexible connection between the floating body and the counterpoise, this flexible connection passing about the anchoring-pulley.

The counterpoise B preferably consists of a metal case of suitable size and weight either open at the bottom or closed by a flexible waterproof diaphragm. The counterpoise may also consist of a compressible water-proof bag completely closed and weighted in a suitable manner.

The chain is constructed of a certain number of different sizes and lengths of ordinary metal chain, or it may be specially manufactured to consist of a number of links of different weights. The heaviest part of the chain is at the bottom, and the lightest is next the counterpoise. It is not absolutely necessary that this part of the system should be chain. A weighted rope might do for this graduated flexible connection, and it need not pass round the pulley, but the light end would be attached to the counterpoise while the heavy end rested on the ground. In this case the counterpoise would be connected to the floating body A by a mooring-rope or chain of uniform size passing round the pulley.

The pulley is made of suitable size and material, and is provided with means of attachment to the anchor or sinker either by swivel or otherwise. Guards are also provided to keep the chain in position while passing round the pulley, and also to prevent cables from being carried round the block, thus causing it to jam.

In Fig. 1 the floating body is represented in position at the time of low water, while in Fig. 2 it is shown at the time of high water.

The principle of the invention is as follows: Supposing the time to be that of low water, as the water-level rises the pressure on the air in the counterpoise increases; more water therefore enters through the aperture at the bottom, or in the case of a collapsing bag, the volume of air becomes smaller; hence the buoyancy of the counterpoise will decrease, and it will sink. As it sinks, however, the chain will pass round the pulley and the floating body will rise. A certain weight of chain will then be suspended from the floating body instead of from the counterpoise, and a new position of equilibrium will then be taken up. Another rise of water-level will produce a similar result, and thus the floating body will rise as the water-level rises. As the water-level falls the inverse action takes place, and the floating body falls while the counterpoise rises. By calculating the weights of chain for every foot of rise of water-level, the system can be so arranged that the floating body will maintain a constant depth below the surface, while the water-level fluctuates. In very shallow water the floating bodies can be moored by means of two pulleys, as shown in Fig. 3. In rather deeper water the method of mooring shown in Figs. 1 and 2 can be adopted, and in deep water either of the arrangements shown in Figs. 4, 5, and 6 can be used. The mooring-rope or chain of the floating body can be made to pass through a ring or rings attached to the counterpoise in order to prevent any twisting action. This is shown in Fig. 7. Where a cable is attached to the floating body it can be led away, as shown in Figs. 8, 11, and 12. In Fig. 11 a small portion of the cable near the ground is wound into a spiral, which acts as a spring, and this allows no slack cable, while the buoy it is attached to rises and falls. The cable is a light-armored cable, rendered spiral by winding it upon a bar. The bar is taken out, and a spiral spring cable is the result. In Fig. 12 the cable is shown wound spirally round or attached to the mooring-rope or chain as far as the pulley, where a spiral is made of sufficient length to allow for the rise of the buoy A. In some cases it may be desirable to keep the floating bodies at or near the bottom until required at any particular time. This can be done by the methods shown in Figs. 9 and 10, where L is a small explosive charge attached to a link in a short length of chain. On exploding the charge the chain is severed. In Fig. 10 two sinkers or anchors, $S'$ and $S^2$, will be required.

It may be desirable in certain cases to employ one counterpoise with a number of floating bodies. One pulley for each buoy, &c., would be required, and one drum or large pulley for the counterpoise.

Instead of using a pulley, a wheel-and-axle arrangement might be used, or a drum, the ends of the chain and mooring-rope being made fast onto the wheel and axle or drum, or the weighted chain may be dispensed with altogether, and a spring used instead in connection with the pulley, wheel and axle, or drum. In this case the mine and counterpoise would be in connection round the pulley, wheel and axle, or drum by an ordinary mooring-rope or chain. As the pulley revolves one way, it would compress a spring in connection with it, and on revolving in the opposite direction the compression of the spring would be reduced.

Having now particularly described and ascertained the nature of our said invention, and in what manner the same is to be performed, we declare that what we claim is—

The combination of the floating body, a counterpoise such as described provided with the graduated flexible connection, lightest at its end next the counterpoise, and increasing in weight toward its opposite end, and flexibly connected with the floating body, and the anchoring-pulley about which passes the flexible connection between the floating body and counterpoise, substantially as and for the purpose hereinbefore set forth.

RICHARD MATTHEWS RUCK.
EDWYN JONES.

Witnesses:
LEONARD J. MATON,
21 *Cannon Street, London, Solicitor.*
GEO. J. B. FRANKLIN,
19 *Gracechurch Street, London, Notary's Clerk.*